United States Patent
Schreiner

[11] 3,791,239
[45] Feb. 12, 1974

[54] VEHICLE TRANSMISSION CONTROL SYSTEM FOR VEHICLES

[75] Inventor: Friedrich Schreiner, Eichelen, Germany

[73] Assignee: Zahnradfabrik Friedrichafen AG, Postfach, Germany

[22] Filed: July 9, 1971

[21] Appl. No.: 161,171

[30] Foreign Application Priority Data
July 11, 1970 Germany.................. P 20 34 503.3

[52] U.S. Cl.................. 74/752 C, 74/336, 74/731, 74/860
[51] Int. Cl............................................. B60k 21/00
[58] Field of Search .. 74/336, 336.5, 731, 752, 860, 74/752 C

[56] References Cited
UNITED STATES PATENTS

| | | | |
|---|---|---|---|
| 2,831,365 | 4/1958 | Herndon | 74/752 |
| 2,913,931 | 11/1959 | Hilpert | 74/731 |
| 2,926,543 | 3/1960 | Holdeman | 74/752 |
| 2,934,976 | 5/1960 | Herndon | 74/752 |
| 2,949,047 | 8/1960 | Burckhardt | 74/731 |
| 3,004,447 | 10/1961 | Sand | 74/752 |
| 3,086,541 | 5/1963 | De Corte | 74/752 |
| 3,369,430 | 2/1968 | Haley | 74/752 |
| 3,452,621 | 7/1969 | Golan | 74/752 |
| 3,640,156 | 2/1972 | Mori | 74/731 |
| 3,604,288 | 9/1971 | Mori | 74/866 X |

Primary Examiner—Benjamin W. Wyche
Assistant Examiner—John Reep
Attorney, Agent, or Firm—Zalkind, Horne & Shuster

[57] ABSTRACT

A vehicle transmission having a shiftable type of gear ratio control mechanism, is automatically operated in accordance with variations in engine speed and vehicle speed. Gear ratio shift is effected under joint control of a vehicle speed signal and an engine speed signal modulated by an amount dependent upon the gear ratio condition of the transmission.

7 Claims, 6 Drawing Figures

Fig. 3
| A | B | C | D | $P_v$ | Gg. |
|---|---|---|---|---|---|
|   |   | × | × | $\frac{1}{\varphi 7} \cdot P$ | I |
|   |   | × |   | $\frac{1}{\varphi 6} \cdot P$ | II |
|   | × |   | × | $\frac{1}{\varphi 5} \cdot P$ | III |
|   | × |   |   | $\frac{1}{\varphi 4} \cdot P$ | IV |
| × |   |   | × | $\frac{1}{\varphi 3} \cdot P$ | V |
| × |   |   |   | $\frac{1}{\varphi 2} \cdot P$ | VI |
|   |   |   | × | $\frac{1}{\varphi 1} \cdot P$ | VII |
|   |   |   |   | $\frac{1}{\varphi 0} \cdot P$ | VIII |
Fig. 4
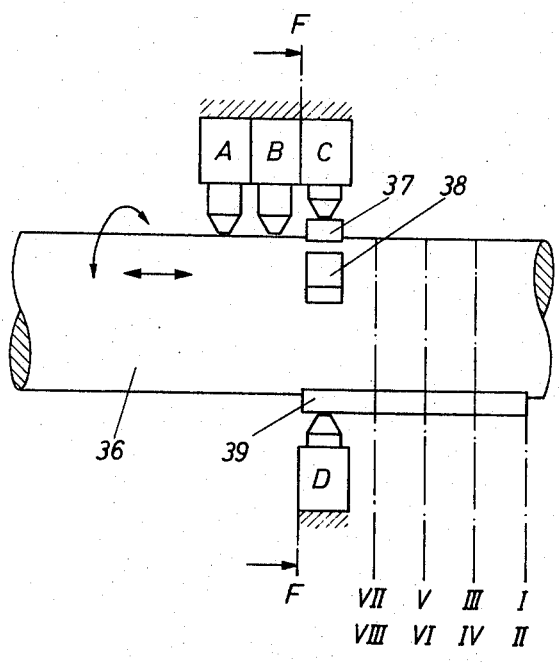
Fig. 5
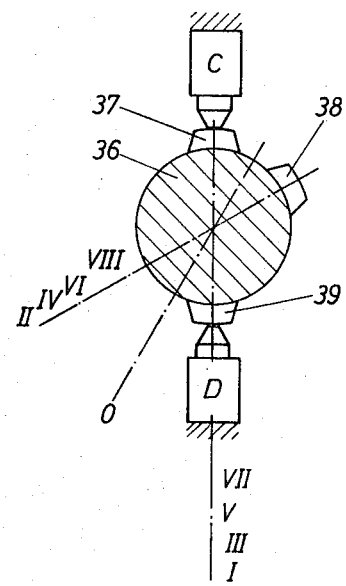
INVENTOR
Friedrich Schreiner
ATTORNEYS

VEHICLE TRANSMISSION CONTROL SYSTEM FOR VEHICLES

This invention relates to plural drive ratio, gear transmissions of the shiftable type having interrelated engine, clutch and gear ratio controls.

Control systems for gear transmissions are known including one type in which engine and output transmission speeds are sensed by tachometer generators to provide speed signals that are fed to an electronic comparator from which a drive ratio controlling output is obtained. An object of the present invention is to provide a control system utilizing speed signals generated by hydraulic types of speed sensing devices driven by the engine and the output of the transmission, and wherein synchronism between the gear ratio changes is automatically effected in response to said speed signals and modulated according to the preselected gear ratio.

Another object of the present invention involves a modulating valve arrangement in which the engine speed signal pressure is reduced by an amount dictated by the drive ratio condition of the gear shifting mechanism. In the valve arrangement, a first regulating piston is exposed to input signal pressure from the engine driven speed sensing device to position a throttling valve through which the signal pressure is reduced. The reduced pressure is applied to a second regulating piston which controls the position of a second throttling valve by means of which the signal pressure is further reduced. The signal fluid is fed through a modulated signal pressure line to a control device. The signal pressure forces exerted on the regulating pistons are opposed by throttled signal pressure applied to pressure faces of progressively larger area than the area of the signal pressure face exposed to the input signal pressure. A plurality of valves controlled by the shifting mechanism select the pressure faces to which the throttled signal pressure is applied in order to determine the amount by which input signal pressure is reduced. The pressure face areas are dimensioned relative to each other to effect signal pressure reduction at a constant progression corresponding to the stepped gear ratio conditions of the transmission.

In the drawings:

FIG. 3 is a chart showing the gear ratio and the signal pressure modulation relationships.

FIG. 4 is a somewhat schematic side elevational view of a portion of the shifting mechanism for actuating the modulation control valves associated with the signal pressure modulator.

FIG. 5 is a transverse sectional view taken substantially through section line F—F in FIG. 4.

Figure 1:
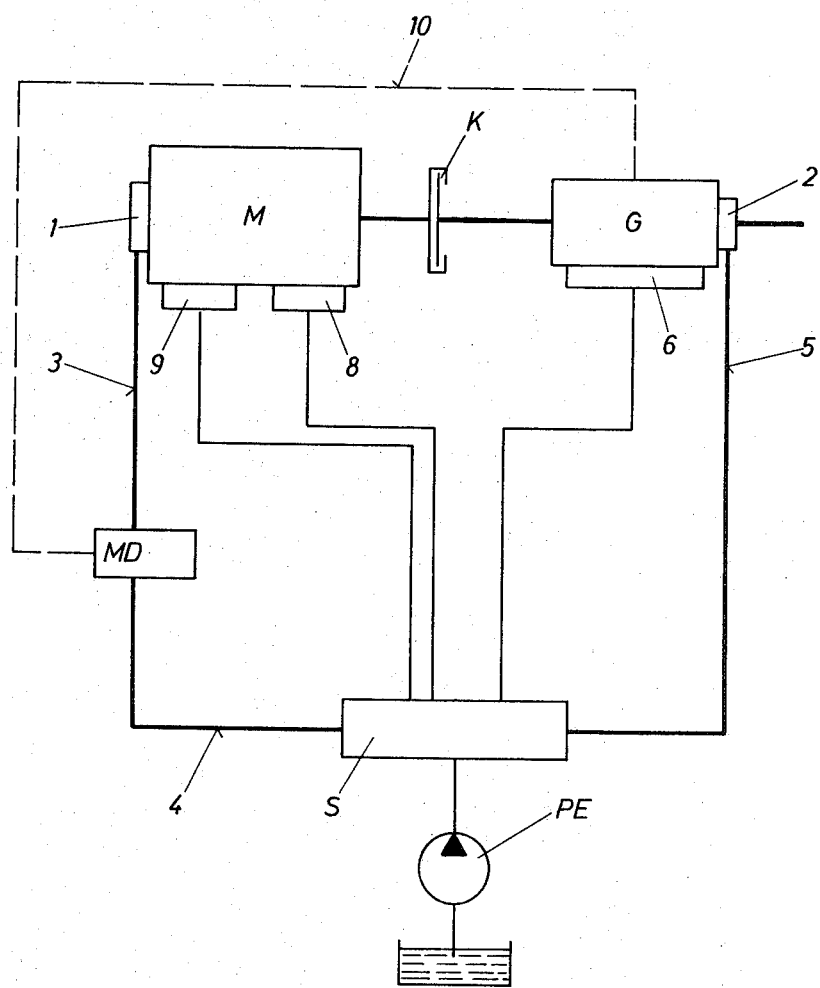
FIG. 1 is a schematic illustration of an engine driven transmission and drive ratio control system.

FIG. 1 illustrates the basic combination with which the present invention is associated. An automotive engine M is drivingly connected by a clutch or coupling K to a gear transmission of the shiftable type. In addition to the usual driver operated controls for the engine, engine speed is automatically varied during each drive ratio changing operation by any well known fluid piston fuel injector pump control 9 and fluid piston type of engine brake control 8. The fuel injector pump control 9 is operative to increase engine speed while brake control 8 is operative to decrease engine speed, both control operations being provided for attaining synchronism in preparation for a change in drive ratio of the transmission G by the shift mechanism 6 associated with the transmission.

Drive ratio changing operation is initiated by a shift control device S through which line pressure fluid from a suitable, engine driven pump source PE, is distributed to the engine controls 8 and 9. The shift control device S also supplies pressurized fluid to the gear shift mechanism 6 to either upshift or downshift the transmission dependent on the relative speeds of the engine and the vehicle or output of the transmission.

As shown in FIG. 1, hydraulic speed sensing devices 1 and 2 are respectively driven by the engine M and transmission G to generate signals of varying magnitude in the form of fluid pressure in lines 3 and 5 that are direct functions of engine and vehicle speeds. The magnitude of the pressure signal in line 3 is reduced by modulator MD to establish a modulated engine speed, pressure signal in line 4 connected to one side of the shift control device S opposite the side to which line 5 is connected. The modulator is under control of the transmission as represented by dotted signal line 10 to progressively reduce engine speed signal pressure (P) in steps as the transmission is upshifted from a first or lowest gear ratio to an eighth or highest gear ratio condition. Thus, the modulated signal pressure (Pv) in line 4 is a function of the engine speed signal pressure (P) in line 3 and an inverse function of a constant progression factor ($\phi$) such that $$P v = P/\phi \ (8-n);$$

where $n$ is the drive gear condition number between 1 and 8.

The modulated signal pressure in line 4 and the speed signal pressure in line 5 jointly influence the shift control device S to automatically operate the gear shift mechanism 6. Whenever there is a significant difference between signal pressure in lines 4 and 5 reflecting a difference in speeds on opposite sides of the transmission couplings which may be realized as claw couplings. The shift control device S is rendered operative to either increase or decrease engine speed momentarily through control 9 or 8 as aforementioned. When signal pressures in lines 4 and 5 approach equality, the shift control device S disables the control 8 or 9 and line pressure is supplied to the shift mechanism 6 to effect either an upshift or downshift of the transmission. If the control system according to the invention forms part of a semi-automatically shifted vehicle transmission a gear is preselected by manually actuating a shifting control shaft 36 (FIGS. 4 and 5), whereat shift control device S is acting in the manner as described here before.

Figure 2:
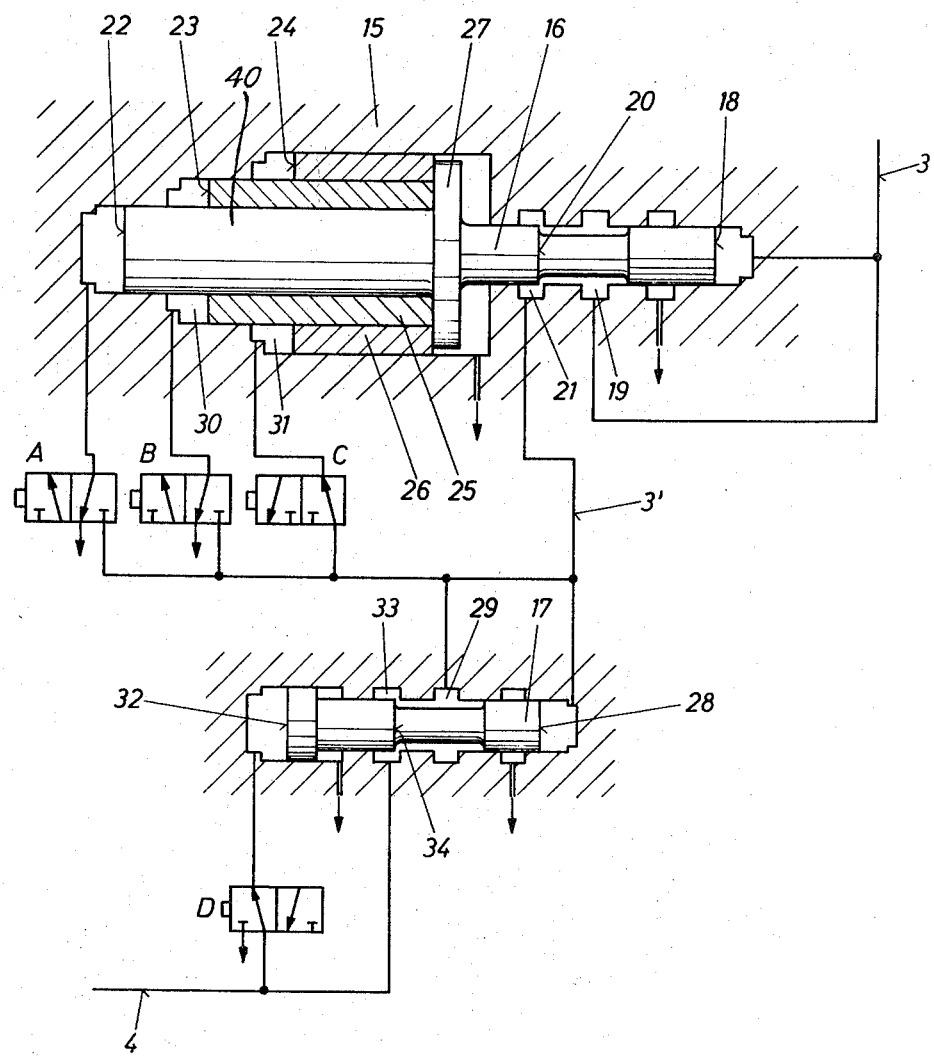
FIG. 2 is a schematic illustration of the signal pressure modulator.

FIG. 2 illustrates the details of the modulator MD diagrammed in FIG. 1. A suitable modulator housing or valve body 15 slidably mounts a first regulating device 16 having an input signal pressure face 18 at one end forming an actuating piston for a throttle valve 20 cooperating with inlet and outlet grooves at 19 and 21. The engine speed signal line 3 is connected to the actuating chamber within which the pressure face 18 is exposed and to the inlet groove 19 of the throttle valve. The input signal pressure accordingly exerts an actuating force on the face 18 to axially position the throttle valve 20 in order to control a first reduced signal pressure in control line 3' to which the outlet 21 is connected. Upon opening of valves A, B, or C the input actuating force on face 18 is applied to pressure faces 22, 23 or 24 formed, respectively, on the end of piston 40 opposite face 18 and the ends of sleeves 25 and 26 to oppose fluid pressure acting on face 18. The sleeves 25 and 26 are of different axial lengths telescopingly mounted on 40 axially spaced from face 22 and in abutment with a flange 27 axially fixed to the piston intermediate pressure faces 18 and 22. When equilibrium of piston 16, 40 is established the pressure faces 22, 23 and 24 are exposed to the reduced signal pressure in line 3' within separate pressure chambers including 30 and 31 upon opening of modulator valves A, B or C.

A second regulating device 17 has a pressure face 28 at one axial end exposed to the throttled signal pressure in line 3' to control the axial position of a second throttle valve 34 within the outlet groove 33 to which the modulated signal line 4 is connected. The force exerted on the device 17 at face 28 is opposed by the force exerted on the opposite piston pressure face 32 by the outlet pressure in line 4 upon opening of a fourth modulator control valve D. Thus, the second throttle valve 34 is effective to further reduce the signal pressure supplied thereto by line 3' at the inlet groove 29.

The effective area ratio of control face 32 to input face 28 in the second regulating device 17, is equal to the constant progression factor $(\phi)$ aforementioned. Accordingly, whenever valve D is opened, the signal pressure is reduced as an inverse function of $(\phi)$. The area ratios of pressure faces 22, 23 and 24 to the input face 18 in regulating device 16, are $(\phi^2)$, $(\phi^4)$ and $(\phi^6)$. Opening of the valves A, B or C will therefore control the reduction in signal pressure by corresponding factors. By opening and closing one of the valves A, B and C alone or combined with valve D, the input signal pressure (P) in line 3 may be reduced in steps in a progression correlated to the eight gear ratios as indicated in the chart of FIG. 3, wherein "X" designates the valves that are opened.

The valves A, B, C and D may be actuated in the desired sequence by an operating arrangement in the shift mechanism 6 as shown in FIGS. 4 and 5. A shift control shaft 36 is axially displaced between four operative positions as shown in FIG. 4, each corresponding to two different gear ratio conditions and is also angularly displaced between two limit positions as shown in FIG. 5 in order to establish the eight gear ratios and the neutral position of the transmission in a manner obvious to persons skilled in the art. The shaft is axially shifted only when it is in a neutral angular position "0" as diagrammed in FIG. 5. Two valve actuating cams 37 and 38 are mounted aligned with one cross-sectional activating plane on the shaft 36. In three of the four axial positions of the shaft 36, the actuating plane of the cams 37 and 38 will be aligned with one of the three valves A, B and C that are actuated by either cam 37 or 38. Valve D on the other hand may be opened by an axially elongated cam 39 on the shaft in only one angular limit position regardless of the axial position of the shaft. The gear ratios obtained in the various axial and angular positions of the shaft 36 are labelled in FIGS. 4 and 5, the four dot-and-dash lines indicating the position of the right-hand end of cam 39 in the four axial shift positions.

Axial and angular movement is imparted to shaft 36 by any suitable manual actuating means in a particular sequence according to the chart of FIG. 3. The shaft may also be operated by hydraulic means in order to automatically effect axial and angular movement of the shaft 36 and to obtain the various gear ratios in an automatic transmission. In the neutral position, the shaft 36 takes the axial position represented in FIG. 4 and the angular position labelled "0" in FIG. 5. In order to short circuit the line pump PE and the speed sensor 1 in the neutral position of selector shaft 36 electromagnetic by-pass valves and electric contacts not represented in the drawing are provided such that the electric contacts may be closed in the neutral position of the shaft 36. As a result pump PE and the speed sensor 1 are idling and shift control valve 41 remains in its central position when the motor M is started. Also, shift mechanism 6 is depressurized when the 1st gear is preselected with the vehicle stationary. In the first gear ratio position of shaft 36 illustrated in FIGS. 4 and 5, cam 37 actuates valve C and cam 39 actuates valve D so that the signal pressure (P) is reduced by regulating device 16 to a value $(P/\phi^6)$ because chamber 31 is pressurized to act on face 24 having an area ratio of $(\phi^6)$ to the face 18. Since valve D is also opened, the pressure is further reduced by $(1/\phi)$ for a resultant modulated pressure of $(P/\phi^7)$ corresponding to a transmission ratio of $\phi^7$ in the first gear.

To shift into 2nd gear the shaft 36 is angularly displaced from its initial limit position to the other limit position in which valve D is released and valve C only is opened, so that the signal pressure (P) is reduced by regulating device 16 alone to a value $(P/\phi^6)$, corresponding to a transmission ratio of $\phi^6$ in the 2nd gear. The next higher or 3rd gear is obtained by first angularly displacing the shaft to the next axial position and completing the shift operation by rotating the shaft to the initial limit position. Now valves B and D being opened and surfaces 23 and 32 pressurized, the signal pressure (P) is reduced to a value of P $1/\phi^4$. $1/\phi$ equal to $P/\phi^5$ which corresponds to a transmission ratio of $\phi^5$ in the 3rd gear. The foregoing procedure is repeated for continued upshift to 7th gear corresponding to an axial position in which the plane of cams 37 and 38 is no longer aligned with any of the valves A, B and C. The right hand end of cam 39 aligns with line VII, VIII in FIG. 4 and valve D is opened resulting in a pressure reduction of $1/\phi$ corresponding to a transmission ratio of $\phi$ in the 7th gear. The shaft 36 may then be angularly displaced to disengage cam 39 from valve D. Motor M is braked through pressurizing of operator 8 and the transmission is shifted into 8th gear corresponding to the non-throttling condition of the modulator, as all valves are closed and there is no opposition to the signal pressure exerted on the throttle valves 20 and 34. As a result pressure (P) in line 3 equals signal pressure in line 4 which corresponds to a transmission ratio of $\phi^0 = 1$ in the 8th gear.

Figure 6:
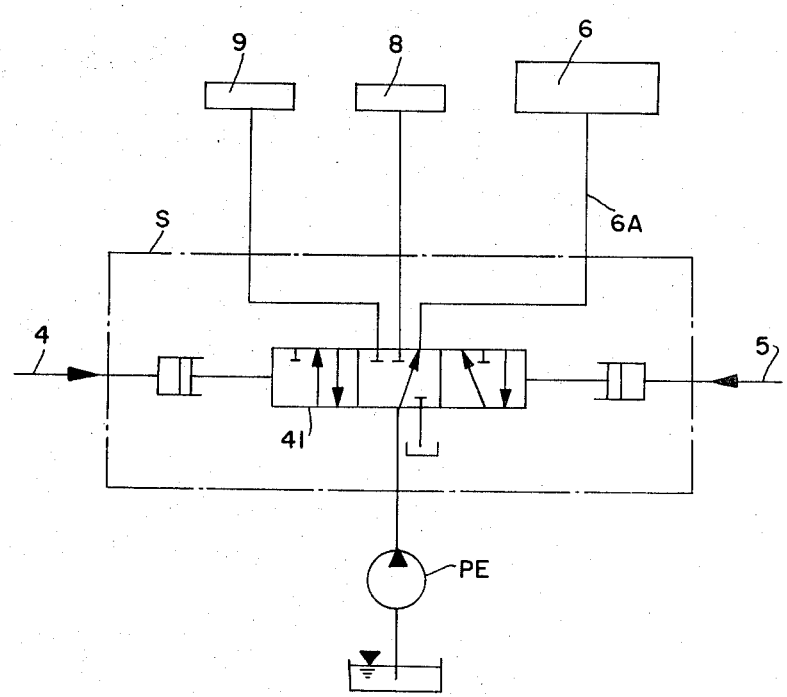
FIG. 6 is a schematic illustration of the details of a typical shifting control device S.

FIG. 6 illustrates one example of a shift control device S capable of performing in accordance with its functions as hereinbefore described. It should, however, be appreciated that persons skilled in the art could devise other shift valve arrangements capable of performing the described functions. The detailed descriptions of the shift valve S and hydraulic actuating assembly which follow are presented to insure a complete understanding of components necessary for operation of the disclosed invention. The details of the shift valve S are not therefore part of the invention as claimed. The shift valve 41 may be displaced from a neutral or balanced position as shown in FIG. 6 to either an upshift or a downshift position when a difference occurs between vehicle speed signal pressure in line 5 and modulated engine speed signal pressure in line 4.

When the vehicle is to be started the gear selector shaft 36 is in neutral position and the motor is idling. Clutch K is disengaged by the driver and the selector shaft is turned into the angular position for the 1st gear represented in FIG. 5. The signal pressure in line 5 is zero and the low signal pressure of the idling motor in line 3 is still reduced by $1/\phi^7$ so that pressure difference in lines 4 and 5 is below the minimum responding value of valve 41, so that valve 41 maintains its central position. The electric contact referred to herebefore being opened, pump PE supplies pressure oil through valve 41 (FIG. 6) to the shift mechanism 6 whereby the 1st gear is established. The driver can depart by releasing clutch K.

Each time before imparting an upshift or downshift movement to the selector shaft 36 the driver releases the accelerator pedal and disengages the clutch. At an upshift movement the modulator MD operates as described herebefore.

When an increasing pressure in line 4 exceeds the pressure in line 5, valve 41 is shifted to the right in FIG. 6 so that line pressure is applied to the brake control 8 to decrease engine speed. The valve 41 then returns to its neutral position as the pressure in lines 4 and 5 are equalized causing shift mechanism 6 to be pressurized. The transmission is accordingly upshifted by the mechanism 6.

A similar procedure occurs to down shift the transmission. When a lower gear is preselected at shaft 36 pressure in line 4 is decreased through modulator MD till pressure in line 5 exceeds pressure in line 4. The valve 41 is then shifted to the left as viewed in FIG. 6 and line pressure is applied to fuel injector operator 9 to increase engine speed. Also, the signal pressure in line 4 is increased up to the level of the pressure in line 5. When equality is approached valve 41 returns to neutral position. Shift mechanism 6 is again connected to pressure source PE and the preselected speed is engaged.

What is claimed is:

1. In combination with an engine and a transmission driven by the engine at a plurality of different drive ratios, a pair of speed sensing devices respectively driven by the engine and the transmission for generating fluid signal pressures, means for modulating the signal pressure produced by the engine driven speed sensing device as a function of the drive ratio of the transmission, and drive control means responsive to the modulated signal pressure and the signal pressure produced by the transmission driven speed sensing device for changing the drive ratio of the transmission, the modulating means including a first piston device having a signal pressure chamber to which the engine driven speed sensing device is connected, a pressure face responsive to signal pressure applied from the engine driven speed sensing device and control chamber means for opposing displacement of the signal pressure face a second piston device having opposed pressure chambers and pressure faces therein, first throttling valve means connected to the signal pressure chamber of the first piston device for supplying a reduced signal pressure fluid to one of the opposed pressure chambers of the second piston device, second throttling valve means connected to the first throttling valve means for further reducing the signal pressure to produce said modulated signal pressure applied to the drive control means, and selectively controlled valve means actuated by the drive control means including a shifting member for controlling the application of reduced signal pressure to the control chambers means of said first piston device and the other of the opposed pressure chambers of said second piston device respectively, to vary the reductions in signal pressure by the first and second throttling valve means.

2. The combination of claim 1 wherein the first piston device further includes a plurality of control pressure faces within the control chamber means having pressure exposed areas progressively larger than the area of the signal pressure responsive face, the pressure face in said other of the opposed pressure chambers of the second piston device having a larger area than that of the pressure face in said one of the opposed chambers, the ratio of pressure face areas in the second piston device being a predetermined progression factor and the face area ratios of the control pressure faces to the signal pressure responsive face of the first piston device being greater than said progression factor by increasing powers thereof.

3. The combination of claim 2 wherein the first piston device further includes a reciprocable element having said signal pressure face at one axial end and a flange axially spaced therefrom, and a plurality of sleeves telescopingly mounted on the element in abutment with the flange, the control pressure faces in the control chamber means being formed on the sleeves at ends remote from flange.

4. The combination of claim 3 including a transmission having $a$ drive ratios, wherein the drive control means includes a shifting member engageable with said selectively controlled valve means, while the area ratio of the opposed pressure faces effective when shifting into a determined drive ratio to the signal pressure responsive face is $(\phi^{a-n})$, where $n$ represents the drive gear condition number and $(\phi)$ the progression factor of the drive ratios which is equal to the area ratio of the opposed pressure faces in the second piston device.

5. The combination of claim 2 including a transmission having $a$ drive ratios wherein the drive control means includes a shifting member engageable with said selectively controlled valve means, while the area ratio of the opposed pressure faces effective when shifting into a determined drive ratio to the signal pressure responsive face is $(\phi^{a-n})$, where $n$ represents the drive gear condition number and $(\phi)$ the progression factor of the drive ratios which is equal to the area ratio of the opposed pressure faces in the second piston device.

6. The combination of claim 2, wherein the drive control means includes a shifting member engageable with one of the control valve means associated either with said first piston device (A, B, C) or with said second piston device (D) and with two of said valve means combined (A + D; B + D . . . ) to attain area ratios of the control pressure faces to the signal pressure responsive face of the first piston device, which ratios being powers of the progression factor $(\phi)$ the exponents of said powers $(\phi^1, \phi^3, \phi^5 \ldots ; \phi^2, \phi^4, \phi^6 \ldots )$ forming a series of whole numbers each two consecutive members of which differ by the number two.

7. The combination of claim 1, including engine control means operatively connected to the drive control means for effecting synchronism between the engine and the transmission in response to pressure signals.

* * * * *